US011663845B2

(12) United States Patent
Sui et al.

(10) Patent No.: US 11,663,845 B2

(45) Date of Patent: May 30, 2023

(54) METHOD AND APPARATUS FOR PRIVACY PROTECTED ASSESSMENT OF MOVEMENT DISORDER VIDEO RECORDINGS

(71) Applicant: Tsinghua University, Beijing (CN)

(72) Inventors: Yanan Sui, Beijing (CN); Bingquan Zhu, Beijing (CN); Luming Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 34 days.

(21) Appl. No.: 17/352,091

(22) Filed: Jun. 18, 2021

(65) Prior Publication Data

US 2022/0036058 A1 Feb. 3, 2022

(30) Foreign Application Priority Data

Jul. 29, 2020 (CN) ........................ 202010745558.8

(51) Int. Cl.

*G06V 40/10* (2022.01)
*G06V 40/16* (2022.01)
*G06V 20/40* (2022.01)
*G06V 40/20* (2022.01)

(52) U.S. Cl.

CPC ........... *G06V 40/103* (2022.01); *G06V 20/46* (2022.01); *G06V 40/171* (2022.01); *G06V 40/172* (2022.01); *G06V 40/176* (2022.01); *G06V 40/23* (2022.01)

(58) Field of Classification Search

CPC .... G06V 40/103; G06V 20/46; G06V 40/171; G06V 40/172; G06V 40/176; G06V 40/23; G06V 10/50; G06V 10/44; G06V 40/161; G06V 20/41; G06V 40/168; G06V 40/20; G06N 3/0454; G06N 3/084

See application file for complete search history.

(56) References Cited

U.S. PATENT DOCUMENTS 9,799,096 B1 * 10/2017 De la Torre .......... A63F 13/655
10,726,480 B2 * 7/2020 Foygel ................... G06Q 40/04
2005/0063582 A1 * 3/2005 Park ........................ G06T 17/10
382/181
2017/0087416 A1 * 3/2017 Hu .................... G06K 9/00543

(Continued)

*Primary Examiner* — Wesley J Tucker

(74) *Attorney, Agent, or Firm* — Novick, Kim & Lee, PLLC; Allen Xue

(57) ABSTRACT

A method for assessing video recordings of movement disorders with privacy protection functions includes: obtaining movement disorder assessment video; performing face-swapping to the subject in the video; identifying key points in the video after face-swapping; determination of the movement feature for assisting diagnosis of diseases according to the changes of the key points with respect to recording time. The movement disorder assessment video is processed to obtain a face-swapped video, which can retain the person's facial expression while the subject has the appearance of a public figure, thereby achieving the purpose of protecting person privacy. By extracting the key points of the human body from the movement disorder assessment video, and monitoring the changes of the key points with the video progress, the movement feature related to the disease can be determined, and the quantifiable key diagnostic indicators of the disease can be obtained.

15 Claims, 8 Drawing Sheets

(56) References Cited

U.S. PATENT DOCUMENTS

| | | | | |
|---|---|---|---|---|
| 2017/0178287 | A1* | 6/2017 | Anderson | G06T 11/00 |
| 2019/0110736 | A1* | 4/2019 | Broderick | G06T 7/246 |
| 2020/0129066 | A1* | 4/2020 | Gedamu | A61B 5/0064 |
| 2020/0281508 | A1* | 9/2020 | Ren | A61B 5/4519 |
| 2020/0373002 | A1* | 11/2020 | Kadambi | G16H 30/40 |
| 2020/0397345 | A1* | 12/2020 | Golestani | G06N 3/08 |
| 2021/0074004 | A1* | 3/2021 | Wang | G06T 5/00 |
| 2021/0195120 | A1* | 6/2021 | King | G06V 20/52 |
| 2021/0209734 | A1* | 7/2021 | Simhadri | G16H 50/20 |
| 2022/0148243 | A1* | 5/2022 | Yang | G06F 16/532 |

* cited by examiner

FIG. 2

METHOD AND APPARATUS FOR PRIVACY PROTECTED ASSESSMENT OF MOVEMENT DISORDER VIDEO RECORDINGS

TECHNICAL FIELD

This invention relates to the field of medical image analysis, in particular to methods and apparatus for assessing, with privacy protection functions, video recordings of persons having movement disorders.

BACKGROUND

Facial expressions or body posture can reflect a number of diseases. For example, Parkinson's disease can cause freezing of facial expression and mobility impairment. Physician can make appropriate diagnosis by judging the person's blinking, ability of opening one's month and gait.

It is very inconvenient for persons with mobility impairments to travel. Therefore, the actual condition of the person can be recorded by video, and the physician can watch the video to make a preliminary diagnosis. However, the video content lacks quantifiable indicators and relies heavily on the physician's experience and subjective judgment, which makes the medical value of the video of person's movements limited so that improvements are needed to make diagnosis based on video recordings more useful. In addition, the movement disorder assessment video contains the person's appearance, which can reveal the person's identity and invade the person's privacy. Existing video privacy protection technologies generally do so by adding pixelization or cover a mask over face. This approach completely eliminates the facial information and makes it impossible to diagnose based on observing facial information.

SUMMARY OF THE INVENTION

In view of this, the present invention provides a method for assessing, with privacy protection functions, video recordings of movement disorders, including: obtaining a video of the movement disorders assessment; performing face-swapping to the subject in the video; identifying the key points of the human body in the video after face-swapping; determining the movement feature used to assist in diagnosing diseases according to the locations of the key points over recording time.

Optionally, performing face-swapping on the person in the video, which includes obtaining the feature data by extracting the feature from the face image in the video using an encoding network, wherein the face image is the image of the area from the eyebrows to the chin; obtaining a reconstructed face image based on the feature data by using a decoding network; replacing the reconstructed face image with the face image in the video.

Optionally, when the face image in the video is a side face image, feature extraction is performed on the face image in the video using an encoding network to obtain feature data, which includes: converting the side face image in the video to the front face image; using an encoding network to perform feature extraction on the frontal image to obtain feature data.

Further, replacing the face image in the video with the reconstructed face image includes: converting the reconstructed front face image to the reconstructed side face image; and using the reconstructed side face image to replace the side face image in the video.

Optionally, before replacing the face image in the video with the adjusted reconstructed face image, the method further includes: adjusting the pixel values of the reconstructed face image according to that of the face image in the video, such that the color histogram of the reconstructed face image matches that of the face image in the video.

Optionally, performing face-swapping on the person in the video, which includes: performing face detection in the video; eliminating erroneous recognition information; averaging out the face detection position between time series after removing the erroneous recognition information to stabilize the face detection position.

Optionally, the erroneous recognition information removal step includes: deleting the face detection information between the first time and the last time when a face cannot be detected; and/or interpolating using the face detection information before and after the missing period to fill in the missing face detection information.

Optionally, the key points include key points of the face, and determining the movement characteristics used to assist in diagnosing diseases according to the changes of the key points with respect to recording time, which includes: determining the corresponding facial area according to the key points of the face; determining the facial expression features used to assist in the diagnosis of diseases according to the changes of the facial area with respect to recording time.

Optionally, the key points on the face include multiple key points around the eyes; and determining the movement characteristics used to assist in diagnosing diseases according to changes in the key points with respect to recording time, which includes: determining the corresponding eye area according to multiple key points around the eye; determining the change of the open eye area according to the change of the eye area with respect to recording time; and determining the blinking frequency according to the change of the open eye area.

Optionally, the facial key points include a number of key points around the mouth; and determining the movement characteristics used to assist in diagnosing diseases according to the changes of the key points with respect to recording time, which includes: determining the mouth area according to multiple key points around the mouth; determining the change of the open mouth area according to the change of the mouth area with respect to recording time.

Optionally, the key point includes an ankle key point; and determining the movement feature used to assist in diagnosing the disease according to the change of the key point with respect to recording time, which includes: determining the stepping action according to the change of the position of the ankle key point with respect to recording time; determining the stepping frequency information according to the stepping action.

Optionally, the key points include a number of key points of finger joints; and determining the movement characteristics used to assist in diagnosing diseases according to the changes of the key points with respect to recording time, which includes: determining the tapping motion of the index finger and the thumb according to the changes in the positions of the key points of the finger joints with respect to recording time; and determining the frequency, amplitude, and trend of change of the tapping of the index finger and the thumb according to the tapping motion.

Optionally, the key points include a number of key points of finger joints; and determining the movement feature used to assist in diagnosing diseases according to the changes of the key points with respect to recording time, which includes: determining the fisting motion according to the position of the key points of the finger joints with respect to recording time; and determining the fisting frequency according to the fisting motion.

Optionally, the key points include wrist key points and elbow key points; and determining the movement feature used to assist in diagnosing diseases according to the changes of the key points with respect to recording time, which includes: determining the rotating motion according to the position of the key point of the wrist and the key point of the elbow over time; and determining the speed of the rotating arm according to the rotation motion.

Optionally, the key points include key points of the hip joint, key points of the shoulder joint, key points of the knees, and key points of the ankles; and determining the movement feature used to assist in the diagnosis of diseases according to the changes of the key points with respect to recording time, which includes: determining the gait according to the changes in the positions of the key points of the hip joint, the key points of the shoulder joint, the key points of the knees, and the key points of the ankles over time; and determining the shifting of the center of gravity information and the degree of swaying of the center of gravity information according to the gait.

Optionally, identify key points in the video recording includes: obtaining key points distribution probability information by recognizing each image frame in the video with help of a neural network; determining the location of the key point according to the key points distribution probability information.

Correspondingly, the present invention also provides a movement disorder assessment video recording analysis apparatus with privacy protection function, including at least one processor and a memory communicatively connected to at least one said processor; wherein, the memory stores the command to be executed by a processor, and the command is executed by at least one processor, so that at least one said processor executes the above-mentioned movement disorder assessment video analysis method with privacy protection function.

According to the movement disorder assessment video analysis method and apparatus provided by the embodiments of the present invention, the movement disorder assessment video is processed to obtain a face-swapped video, which retains the protected person's facial expression, and has the appearance of a public figure. This achieves the objective of protecting person's privacy, and has a high degree of restoration of expressions. By extracting the key points of the human body from the movement disorder assessment video, and monitoring the changes of the key points with the video progress, the movement feature related to the disease are determined, thereby obtaining quantifiable key diagnostic indicators of the disease, giving the movement video more medical value, effectively assisting physicians to diagnose related diseases, and achieving higher practicability.

BRIEF DESCRIPTION OF THE DRAWINGS

FIG. 2 is an image showing key points used in an embodiment of the present invention;

Figure 1:
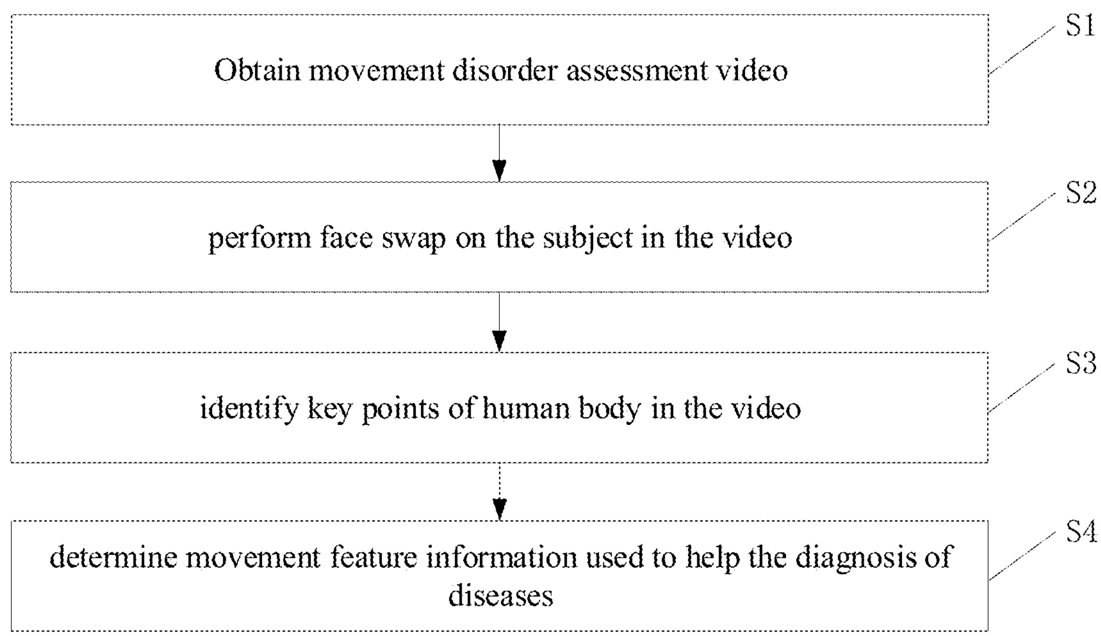
FIG. 1 is a flowchart of a method for analyzing a video recording of a person having movement disorder in an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses, and/or methods described herein may be apparent to one of ordinary skill in the art.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Used herein, the terms “first” and “second” are only used for descriptive purposes, and should not be taken as indicating or implying relative importance. In addition, the technical features involved in the different embodiments of the present invention described below may be combined with each other as long as there is no conflict between them.

The embodiments of the present invention provide a movement disorder assessment video analysis method. The present method may be performed using an electronic device, such as a computer, a portable terminal or a server.

As shown in FIG. 1, the method includes the following steps:

S1. obtaining a movement disorder assessment video, hereinafter referred to as movement video or video. The video of a person is recorded for a certain time length. The person is asked to complete some movements during recording, such as walking, sitting down, standing up, and so on, thus the person's movement over a period of time is recorded.

S2. performing face swap on the subject in the video. Specifically, the appearance of the person in the video is replaced with the appearance of another person. In this process, it is necessary to generate a reconstructed face image based on the person's actual appearance and public face information prepared in advance, and then use the reconstructed face image to replace the person's face image in the video to achieve the purpose of protecting the person's privacy.

S3. identifying the key points of the human body in the video after face-swapping. Examples of such key points include wrists, elbows, shoulder joints, hip joints, knees, ankles, and key points on the face such as areas around eyes and mouth. As shown in FIG. 2, the image is a frame of the video, in which multiple key points of the whole body are marked. Specific key points can be determined based on the motor function of the movement disorder assessment.

Figure 3:
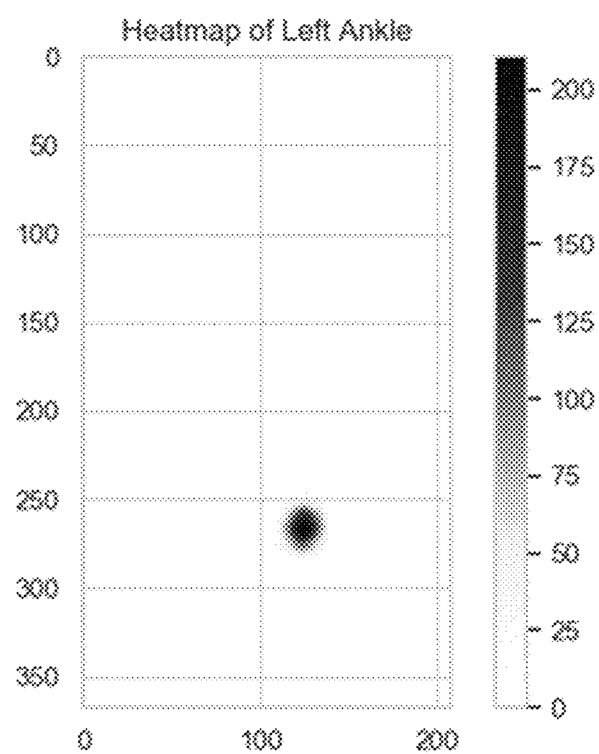
FIG. 3 is a distribution probability diagram showing key points obtained by using a neural network model in an embodiment of the present invention.

There are different ways to identify and track key points in the video. The present disclosure uses existing technology to identify key points. In order to improve accuracy, a deep neural network is used in a preferred embodiment to identify the above-mentioned key points. Specifically, the neural network is pre-trained using human images labeled with key points, so that it can recognize the required key points in the image. When applying this technique, each video frame is extracted and input into the trained neural network. The neural network of this embodiment recognizes the input image and outputs the distribution probability data for each key point, which can be in form of a distribution probability map as shown in FIG. 3. FIG. 3 is a left ankle heat distribution probability diagram of the key point, where the abscissa is the x-coordinate of the input image, the ordinate is the y-coordinate of the input image. The legend on the right side represents temperature. A deeper color represents a higher temperature. The place with the highest probability value, that is, the place with the highest temperature is the estimated position of the key point of the left ankle. In this manner, the pixel position of each key point of the body in the picture can be identified. If the probability value is less than a given threshold, it is determined that the key point does not exist.

S4, determining the movement feature information used to help the diagnosis of diseases. For example, the movement feature information such as facial expression can be used to assist the physician in determining whether there is facial freezing due to Parkinson's disease. The movement feature information such as foot/leg movement can be used to assist the physician in determining whether there are movement disorders caused by various diseases.

According to an embodiment of the movement disorder assessment video analysis method, the movement disorder assessment video is processed to obtain a face-swapped video. The face-swapped video can retain the person's facial expression but has the appearance of a public figure, thereby achieving the purpose of protecting the person's privacy, and having a high degree of restoration of expressions. By extracting the key points of the human body from the movement disorder assessment video, and monitoring the changes of the key points at different times in the video, the movement feature related to the disease can be determined, thereby obtaining quantifiable key diagnostic indicators of the disease, making the movement video medically valuable, effectively assisting physicians in diagnosing related diseases, and achieving higher usability.

In one embodiment, key points include a number of key points around the eyes. In this embodiment, step S4 specifically includes:

S41A, determining the eye area according to multiple key points around the eye, i.e., the area surrounded by key points of each eye.

Figure 4:
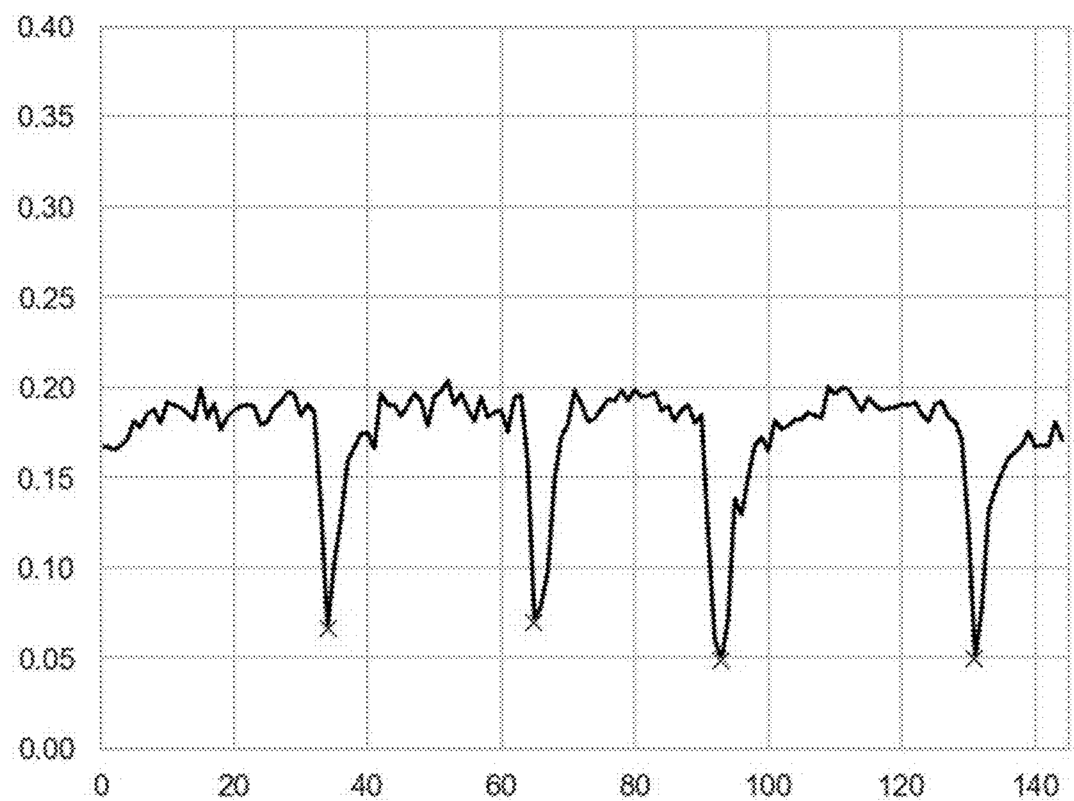
FIG. 4 is a diagram showing the relationship between the area of an open eye and the progress of video in the embodiment of the present invention.

S42A, determining the change in the area of the opened eye according to the change in the eye area at various times in the video. The area surrounded by the key points about the marked eye can be calculated and normalized. For example, dividing the area of the open eye by the square of the width of the eye obtains the normalized area of the opened eye. In doing so, one can draw and present a diagram of the relationship between the area of the opened eye and the time of the video, such as the diagram shown in FIG. 4, in which the abscissa represents the time of the video recording, and the ordinate represents the area of opened eye.

S43A, determining the blinking frequency according to the change of the area of the opened eye. For example, in the diagram shown in FIG. 4, the local minimum corresponds to the blinking action, so that the blinking frequency of the subject can be calculated.

According to the above-mentioned preferred technique, the obtained the area of the opened eye and blinking frequency can be used as key indicators for the diagnosis of Parkinson's disease. The physician can evaluate (score) the person's condition based on this quantitative data so as to prevent the physician from making excessively subjective judgments.

In another embodiment, key points include a number of key points around the mouth. In this embodiment, step S4 specifically includes:

S41B, determining the mouth area according to multiple key points around the mouth. In this embodiment, the mouth circumference refers to the inner mouth circumference, that is, the circumference of the opening in the mouth, that is, the area enclosed by each key point of the inner mouth circumference.

S42B, determining area of the opened mouth over time in the video. The area surrounded by the key points around the marked mouth can be calculated, and normalization can be performed, such as dividing the area of the open mouth area by the square of the width of the mouth to obtain the normalized open mouth area. By doing this, it is possible to draw and present a relationship diagram between the area of open mouth over video time, such as a diagram similar to FIG. 4, in which the abscissa represents the video time, and the ordinate represents the area of open mouth.

According to the above-mentioned preferred technique, the obtained open mouth area and its change can be used as a key indicator for the diagnosis of Parkinson's disease. Physicians can evaluate the person's condition based on this quantitative data, so as to prevent physicians from making excessively subjective judgment.

In still another embodiment, the key points include ankle key points. In this embodiment, step S4 specifically includes:

S41C, determining the stepping action according to the change in the key points of the ankles over time. Specifically, the positions of the two ankles key points are respectively determined, so as to determine the change of their relative positions, and detecting the positions of two ankles can determine the stepping action.

Figure 5:
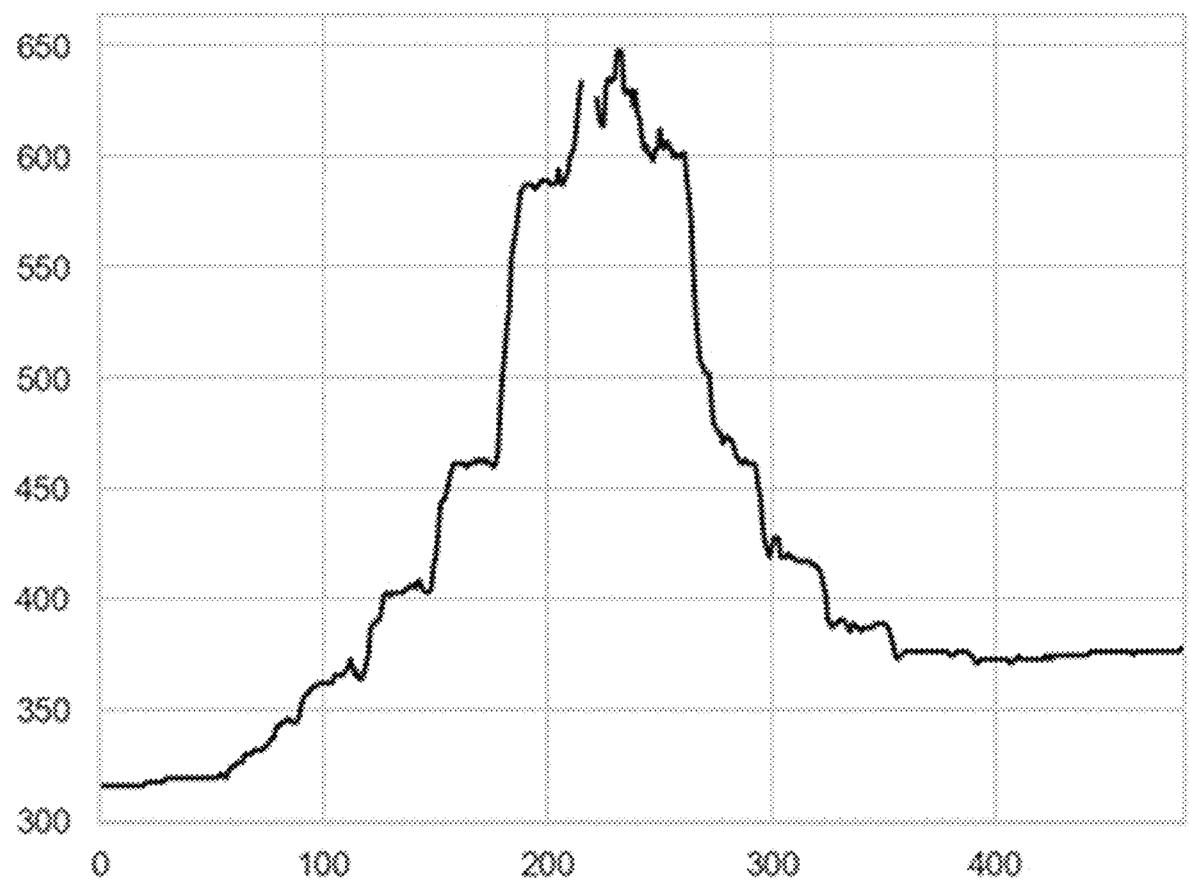
FIG. 5 is a diagram showing the relationship between ankle distance and the progress of video in an embodiment of the present invention.

S42C, determining the step frequency according to the step action. A relationship diagram can be drawn between the relative position and the video time, such as the diagram shown in FIG. 5, where the abscissa represents the video time, the ordinate is the distance between the left and right ankle key points.

According to the above-mentioned preferred technique, the obtained step frequency can be used as a key indicator for diagnosing Parkinson's disease. Physicians can evaluate the person's condition based on this quantitative data, so as to prevent the physician from making excessively subjective judgments.

Similar to the above disclosed three embodiments, in another embodiment the key points may also include key points of the finger joints. By examining the positions of the finger joints of each finger, finger tapping movements due to Parkinson's disease can be detected, and the index finger and thumb tapping frequency, amplitude, and trend over time can be calculated. It can also be used for evaluating the palm movements (first clinching) in Parkinson's disease, and calculating the frequency of first clinching, etc.

Key points can also include wrist and elbow key points. By detecting the position of the key points of wrists and elbows, the rotation movement (forearm gyrating movement) in Parkinson's disease evaluation can be detected, and the speed of the rotation in the arm can be calculated.

Key points can also include hip joints, shoulder joints, and knees. By detecting positions of the hip joints, shoulder joints, knees, and/or ankles, the degree of abnormality in gait can be evaluated, and information such as shifting in the center of gravity and the degree of swaying of the center of gravity can be given.

The present disclosure also provides a movement disorder assessment video analysis apparatus, comprising: at least one processor and a memory connected to at least one said processor; wherein, the memory stores the command to be executed by the said processor, and the command is executed by at least one said processor, so that at least one said processor executes the above-mentioned movement disorder assessment video analysis method.

Figure 6:
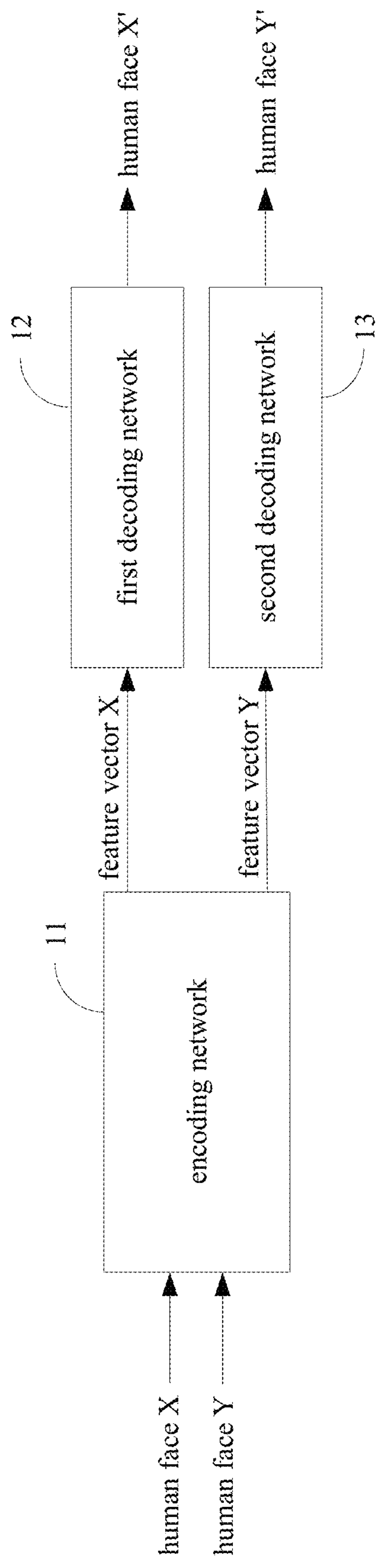
FIG. 6 is a diagram showing the working principle of face-swapping network during the training phase of the embodiment of the present invention.

Regarding the face-swapping process in step S2, in a preferred embodiment, a machine learning algorithm is used to change the face image, which specifically refers to the face-swapping process of the person's image using the deep learning technology. For this reason, the embodiment of the present invention provides a face-swapping model and a training method thereof. The method can be executed by electronic devices such as computers or servers. As shown in FIG. 6, the face-swapping model includes an encoding network 11, a first decoding network 12, and a second decoding network 13 (the network in this application refers to a neural network).

First, a large amount of training data is prepared. Each training data in this embodiment includes a first face image (hereinafter referred to as "face X") and a second face image (hereinafter referred to as "face Y"), namely two different human face images. As an example, a piece of training data includes face X and face Y, and face X is used as the target to be replaced during face-swapping processing. Face Y is used to replace face X. These two images are images of real people. This solution focuses on protecting the privacy of face X, and replacing face X with face Y to protection privacy. The face Y can be a public image.

Regarding the amount of training data, more than 1,000 the first face images and the second face images are sufficient. As a preferred embodiment, the number of the first face image and the second face image in the large amount of training data used are equal, for example, 5,000 pieces each, so a total of 10,000 face images are used as training data. The face-swapping model shown in FIG. 1 is trained with these training data.

Take a training data as an example to illustrate the training process: face X and face Y are used as input data. During the training process, the encoding network 11 performs feature extraction to the first face image (face X) and the second face image (face Y) respectively—to obtain first feature data of the first face image (hereinafter referred to as "feature vector X") and second feature data of the second face image (hereinafter referred to as "feature vector Y").

The first decoding network 12 obtains the first reconstructed face image (hereinafter referred to as "face X'") according to the first feature data (feature vector X); the second decoding network 13 obtains the second reconstructed face image (hereinafter referred to as "face Y'") according to the second feature data (feature vector Y). Then, according to the difference (loss1) between the first reconstructed face image (face X') and the first face image (face X), and the difference (loss2) between the second reconstructed face image (face Y') and the second face image (face Y), it optimizes the parameters of the face-swapping model, where the parameters include the weights of each layer of the three networks.

Specifically, the loss function is obtained by calculating the difference between face X' and face X, and the difference between face Y' and face Y. According to the loss function, the backpropagation algorithm is used to calculate the change of the weight of each layer of the network, and the weights of each layer of the network are updated. Taking the difference between face X' and face X as an example, DSSIM (Difference of Structural Similarity) can be used to represent the difference:

$$DSSIM(x, x') = \frac{1 - \frac{(2\mu_x\mu_x + C_1)(2\sigma_{xx'} + C_2)}{(\mu_x^2 + \mu_{x'}^2 + C_1)(\sigma_x^2 + \sigma_{x'}^2 + C_2)}}{2},$$

wherein $\mu_x$ is the average value of pixels of face X, $\sigma_x^2$ is the variance of pixels of face X, $\mu_x$ is the average value of pixels of face X', $\sigma_x^2$ is the variance of pixels of face X', $\sigma_{xx'}$ is the covariance of x and x', $C_1=(0.01)^2$ and $C_2=(0.03)^2$.

Using a large amount of training data, the above training process is continuously repeated until the difference between face X' and face X and the difference between face Y' and face Y are less than the threshold, and the network training is complete. The trained encoding network 11 can effectively extract the face feature vector, and the first decoding network 12 and the second decoding network 13 can reconstruct the face feature vector into a corresponding face picture.

According to the face-swapping model training method provided by the embodiments in this disclosure, the adopted face-swapping model includes an encoding network and two decoding networks. After training with a large number of sample images, the encoding network can accurately extract feature information from the two face images. The decoding networks can accurately reconstruct the face image with a high degree of restoration of the original image's facial expression. In the training, the first decoding network reconstructs the image according to the feature information of the person's face image, and the second decoding network reconstructs the image according to the feature information of the public image. After the training is completed, when it is used to swap the face, just replace the input of the second decoding network with the feature information of the person's face image to obtain a face-swapped reconstructed image. The image retains the person's facial expression and has the appearance of a public figure, thereby achieving the purpose of protecting the person's privacy while retaining with a high degree the expressions.

Figure 7:
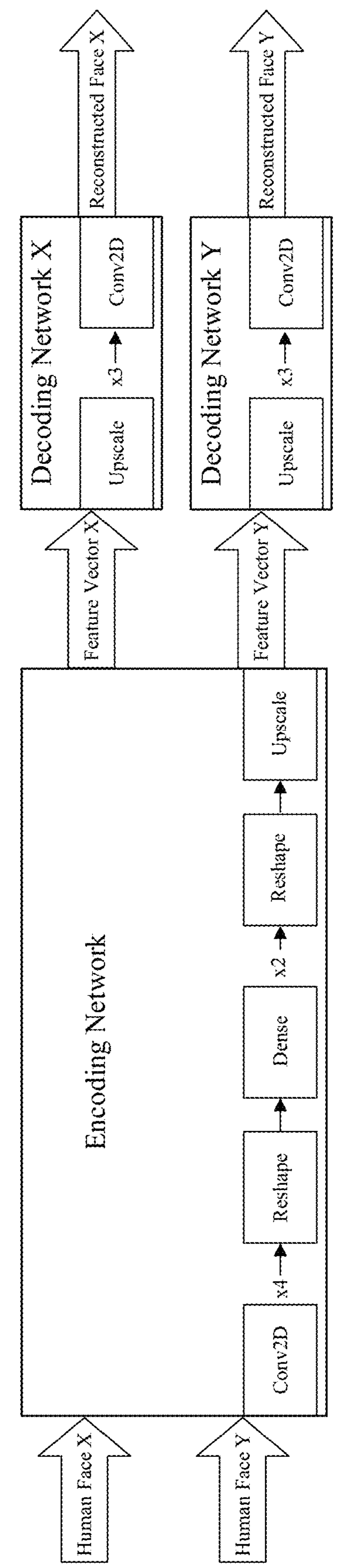
FIG. 7 is a diagram showing the working principle of a specific face-swapping network in the training phase of an embodiment of the present invention.

In still a specific embodiment, the network structure shown in FIG. 7 is adopted, where the encoding network 11 includes four Conv2D (two-dimensional convolutional layers), Reshape (shape adjustment layer), two Dense (fully connected layers), Reshape (shape adjustment layer), and Upscale (upscale layer) connected in sequence. The two-dimensional convolutional layer implements feature extraction and outputs a high-dimensional vector. The shape adjustment layer adjusts the extracted feature to a one-dimensional vector, which facilitates further extraction of features by the subsequent fully connected layers. The shape adjustment layer adjusts the vector to a suitable shape, and the upscaling layer enlarges it to a suitable size. In this manner the features of face X and face Y can be extracted, and two 8×8×512 dimensional feature vectors are obtained.

The first decoding network 12 and the second decoding network 13 have the same structure, including three Upscale (upscale layers) and Conv2D (two-dimensional convolutional layer) connected in sequence. Face X' and face Y' are reconstructed according to the two 8×8×512 dimensional feature vectors. The decoding network first enlarges the feature vector to a suitable size and then processes it, and outputs the reconstructed face image. After the model is trained, the parameters of each layer of the decoding network represent a specific face, and the feature vector represents the expression of the face. The vector passes through the decoding network to form a reconstructed face.

It should be noted that FIG. 7 shows a verified network form, and the present invention is not limited to using this network structure.

The above technique can be used to process movement disorder videos, in which the face of the real person is replaced with a public image. In order to obtain a face-swapping model dedicated to a certain person, this embodiment obtains part of the training data from the person's movement disorder video. Specifically, first obtaining the person's movement video, which is a whole-body video used for the analysis of human movement feature. In order to obtain training data, human faces can be detected in the movement disorder assessment video. For example, multiple frames of images can be extracted, and the positions of the human faces can be detected. The obtained face image is used as the first face image (face X), that is, target for replacement. Then, multiple face images of another person (a public figure) can be acquired as the second face image (face Y).

In order to improve the practicability of the trained model, when acquiring training data, the multiple training data should include first face images with different shooting angles, different lighting conditions, and/or different expressions, such as 5,000 face X pictures with different angles, lighting, expressions, etc. Accordingly, multiple training data should include second face images with different shooting angles, different lighting conditions, and/or different expressions, such as 5,000 face Y pictures with different angles, lighting, expressions, etc.

After the model training is complete, it can be used to replace faces. The embodiment of the present disclosure provides a method for swapping the face from a person's image, and the method can be executed by an electronic device such as a computer or a server. The method includes the following steps:

S1A, training a face-swapping model for a certain person according to the above training method. During training, the face image of the person is used as the first face image, and the face image of another person (public figure) is used as the second face image. This process has been illustrated in FIG. 6, FIG. 7, and descriptions thereof, which is not repeated here.

S2A, using the trained encoding network 11 to perform feature extraction on the first face image to obtain first feature data. This step is similar to the model training process, that is, to only perform feature extraction on face X to obtain the feature vector X.

Figure 8:
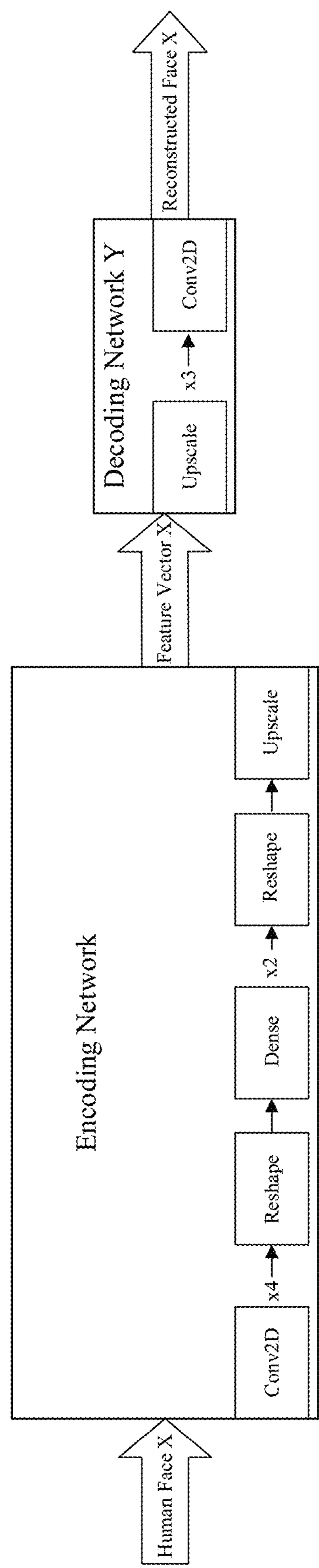
FIG. 8 is a diagram showing the working principle of the face-swapping network in the face-swapping phase of the embodiment of the present invention.

S3A, using the trained second decoding network 13 to obtain a reconstructed face image according to the first feature data. As shown in FIG. 8, this step is different from the model training process. In the face-swapping process, the first decoding network 12 is no longer needed, but the second decoding network 13 is used to obtain the reconstructed face image according to the feature vector X. In the training process, what the second decoding network 13 learns is the appearance information of the public figure, while the input feature vector at this time is the information of face X. The image obtained here is neither that of the aforementioned face X' nor the aforementioned face Y'. The reconstructed face image has the appearance of face Y, while the facial expression are retained from the information of face X.

According to the face-swapping method provided by the embodiment of the present invention, the adopted face-swapping model includes an encoding network and two decoding networks, and the model is trained with the face image of the person and the face image of the public figure, so that the encoding network can accurately extract the feature information from the person's face image, and use the feature information of the person's face image as the input to the second decoding network, thereby obtaining a face-swapped reconstructed image, which can retain the person's facial expression, and have the appearance of a public figure, thereby accomplishing the objective of protecting person's privacy and retaining with a high degree the expressions.

A further embodiment of the present disclosure provides a method for swapping the face of a person in a movement disorder assessment video. The method can be executed by an electronic device such as a computer or a server.

The method includes the following steps:

S1B, extracting the person's movement disorder assessment video frame by frame as the images to be processed;

S2B: recognizing the face image in each image to be processed. In particular, using a face detection tool (e.g. dlib Face Recognition Tool) to detect the face from the image extracted from the movement disorder assessment video and indicate the position of the face. The face position is represented using the position of upper corners of the detection box x and y, and the height and width of the box h and w. According to the detected face position, a frame of the face area is cut out for each movement video image to form a picture set of face X. In order to improve the accuracy of the subsequent face-swapping process. The face image recognized in this step refers to the image of the face area from the eyebrows to the chin. To avoid the interference from, e.g., hair, it is not necessary to identify and replace the forehead area above the eyebrows in the subsequent process.

S3B, training a face-swapping model for the person according to the above training method. During training, the person's face image extracted and recognized from the video is used as the first face image (picture set of face X), and the face image of another person (a public figure) is used as the second face image. This process is illustrated in FIG. 6, FIG. 7, and descriptions thereof, which is not repeated here.

S4B, using the trained encoding network 11 to perform feature extraction on each face image to obtain feature data of the face image. This step is similar to the model training process, that is, to only performing feature extraction on each person's face image to obtain the feature vector.

S5B, using the second decoding network 13 to obtain the reconstructed face image corresponding to each face image according to each feature data. Referring to the above step S3B, each reconstructed face image has the appearance of a public figure, while the person's facial expression are retained.

S6B, replacing the face images of the images to be processed with each corresponding reconstructed face image, and combine into a video. That is, each reconstructed face image is filled back to the position of the face detected in the original movement video image to complete the face swap, and the images after the face swap are integrated into a video in chronological order.

According to the face-swapping method provided by the embodiment of the present disclosure, each frame of the image in the movement disorder assessment video is processed to obtain a reconstructed image of the swapped face, and then the face-swapped images are integrated into the video, which retains the person's facial expressions, and has the appearance of a public figure, thus accomplishing the goal of protecting person privacy, and restores with a high degree facial expressions, making movement videos more medically valuable. Extracting the key points of movement based on the movement video after face-swap, and analyzing the feature composed of these key points, can be used for medical evaluation of whole body movement, and can also be utilized specifically for feature extraction and disease evaluation for facial movement delay.

Figure 9:
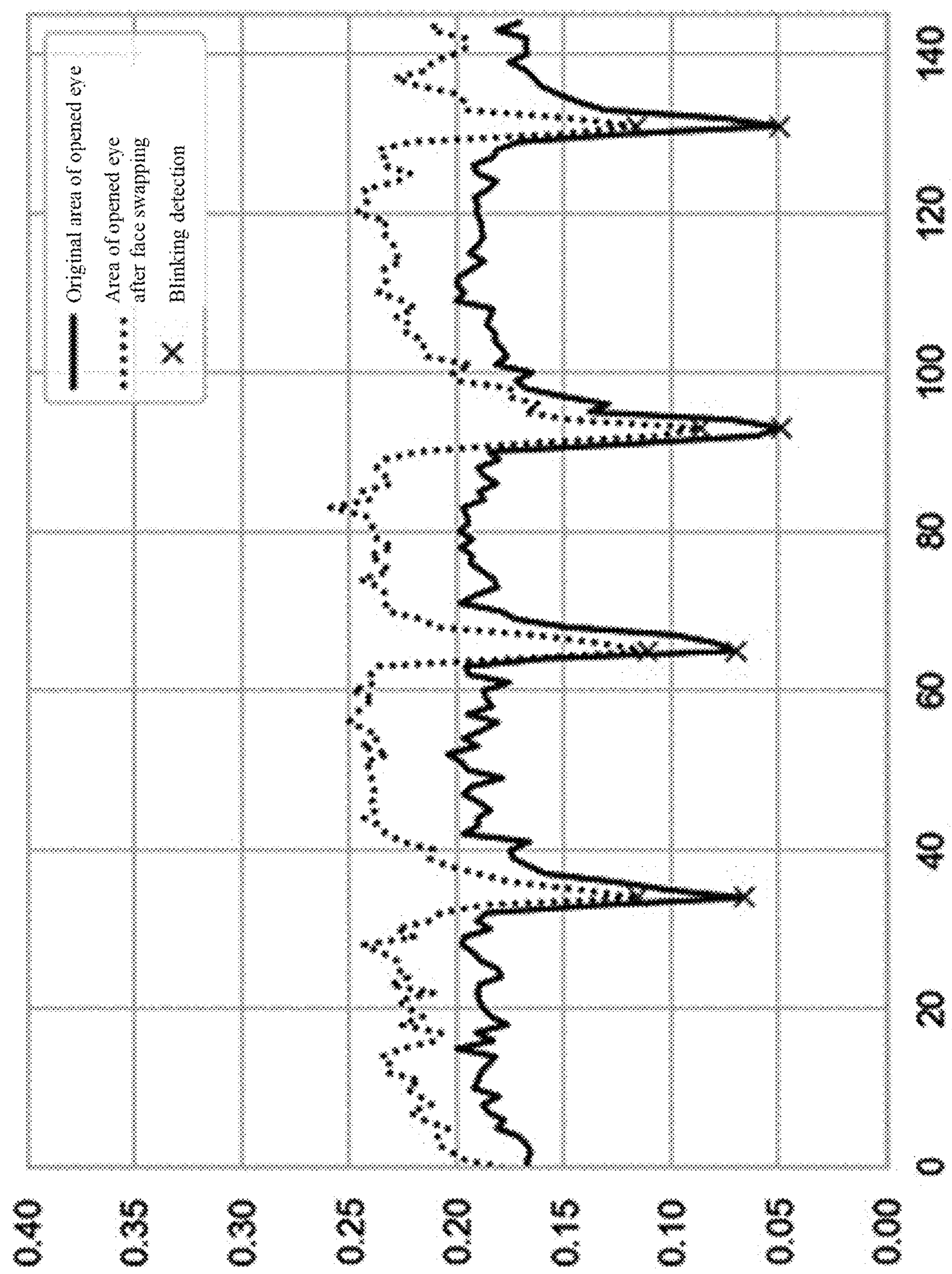
FIG. 9 is a diagram showing the comparison for the open eye area before and after the progress of the video of the embodiment of the present invention.

FIG. 9 shows the obtained area of opened eye over time after swapping the face in the movement video in the above-mentioned manner and analyzing the video after face-swapping to determine the blinking action according to the method described in the above embodiment. Comparing the line after the face swap (indicated by the dotted line) and the line before the face swap (indicated by the solid line), one can see that the blinking action can still be accurately analyzed based on the video after the face swap. The face-swapping method provided in this embodiment protects the privacy of the person and restores to a high degree facial expressions, and does not affect the analysis of facial expressions.

In still a further embodiment, when training the face-swapping model (step S3B), a variety of target faces (the second face image) may be provided from the database with different genders, races, face shapes and facial features of public figures. The person can select multiple face images to train the face-swapping model, and then analyze the similarity of the face-swapping results to determine a face-swapping model that is most suitable for the person's face.

To enhance the stability of the face-swapping process, error correction for face detection in the video is performed in a preferred embodiment. That is, step S2B first performs face detection in the video, eliminates the erroneous recognition information, and then averages out the face detection position over a time window after removal of the erroneous recognition information to stabilize the face detection position.

There are two situations in which erroneous recognition information can be eliminated. The first situation is that the person turns away in the video and the face cannot be recognized for a certain period of time; the second situation is that, even though the person does not turn away, occasionally face detection information is missing. For the first type of erroneous recognition information, this embodiment deletes the face detection information from the first moment the face cannot be detected until the last moment the face cannot be detected. For the second type of erroneous recognition information, the face detection information before and after the missing information is used for interpolation to fill in the gap.

In practice the person in the video may turn his or her head so that the side face image is detected. Considering the fact that the face-swapping network used in this embodiment is not as effective in processing side face images as in processing frontal face images, side face image is more likely to reveal the original facial features. In a preferred embodiment, side face images are further processed. In step S4B, the side face image in the video is converted to a frontal face image, using models such as the Rotate-and-Render. Then, the encoding network 11 is used to perform feature extraction on the face image to obtain feature data. In step S6B, it is necessary to first convert the reconstructed frontal face image into a reconstructed side face image; then use the reconstructed side face image to replace the side face image in the video. This can improve the face swapping effect of the side face, and further protect person privacy.

In the test, it is found that the color of the reconstructed face image in step S5B is often different from that of the original face image, which leads to inconsistent colors between the face area and the forehead area after the face swap. In order to overcome this defect, in a preferred embodiment, before step S6B, the pixel values of the reconstructed face image are adjusted according to the pixel values of the face image in the video so that the color histogram of the adjusted reconstructed face image matches that of the face in the video.

Specifically, for the original face image in the video, the value distribution of the pixels in the R, G, and B color channels are respectively calculated to obtain the histogram of the value distribution of the R, G, and B color channels. For the reconstructed face image, the value distribution of all pixels of the three channels of R, G, and B is also calculated. Adjusting the color is to adjust the distribution of the R, G, and B color channels of the reconstructed face image to the distribution similar to that of the original face image. Using the R color channel as an example, assuming that the original face image contains a number of pixels having a certain brightness value equal to or less than "a" and the percentage of such pixels in all pixels is "p." In the corresponding reconstructed face image, "p" percent of pixels has a brightness value equals to or less than "b." One can change value "b" to value "a" to complete the histogram matching.

In addition, in the process of analyzing the movement video after the face swap, key points can be verified. Specifically, for example, it can detect whether the key points in the video are lost, whether the sharpness of the image meets the expectation, whether the key points are blocked, whether the size meets the requirement, etc. If the video quality after the face swap does not meet the expectation, or such that the key points cannot be detected accurately, the target face (the second face) can be replaced and the face-swapping model retrained.

Those skilled in the art should understand that the embodiments of the present invention may be provided as methods, systems, or computer program products. Therefore, the present invention may adopt the form of a complete hardware embodiment, a complete software embodiment, or an embodiment combining software and hardware. Moreover, the present invention may adopt the form of a computer program product implemented on one or more computer-usable storage media (including but not limited to disk memory, CD-ROM, optical memory, etc.) containing computer-readable program codes.

The present invention is described with reference to flowcharts and/or block diagrams of methods, devices (systems), and computer program products according to embodiments of the present invention. It should be understood that each process and/or block in the flowchart and/or block diagram, and the combination of processes and/or blocks in the flowchart and/or block diagram can be realized by computer program commands. These computer program commands can be provided to the processor of a general-purpose computer, a special-purpose computer, an embedded processor, or other programmable data processing equipment to generate a machine, so that the commands executed by the computer or other programmable data processing equipment realize the functions specified in one or more processes in the flowchart and/or one or more blocks in the block diagram.

These computer program commands can also be stored in a computer-readable memory that can guide a computer or other programmable data processing equipment to work in a specific manner, so that the commands stored in the computer-readable memory produce an article of manufacture including the instruction device. The device implements the functions specified in one or more processes in the flowchart and/or one or more blocks in the block diagram.

These computer program commands can also be loaded on a computer or other programmable data processing equipment, so that a series of operation steps are executed on the computer or other programmable equipment to produce computer-implemented processing, so as to execute on the computer or other programmable equipment and provide steps for implementing functions specified in one or more processes in the flowchart and/or one or more blocks in the block diagram.

The above-mentioned embodiments are merely exemplary for illustrative purposes, and are not intended to limit the implementation. For those of ordinary skill in the art, other changes or changes in different forms can be made on the basis of the above description. It is unnecessary and impossible to list all the implementation methods in this disclosure. Changes or modifications derived from embodiments in this disclosure are still within the protection scope of the present invention.

We claim:

1. An analysis method for movement disorder assessment video having privacy protection function, comprising:

obtaining a video of a subject person being assessed;

performing face swap to the subject person in the video;

identify key points on a body of the subject in the video; and determining movement feature associated with a disease based on changes in the key points over time, wherein the step of face-swapping comprises:

inputting into an encoding network training data that comprises a plurality of first face images of the subject person and a plurality of second face images of a second person;

extracting a first feature from the plurality of first face images to obtain a first feature data;

extracting a second feature from the plurality of second face images to obtain a second feature data;

generating a first reconstructed face image using a first decoding network according to the first feature data;

generating a second reconstructed face image using a second decoding network according to the second feature data;

training the encoding network, the first decoding network, and the second decoding network until a difference between the first reconstructed face image and the first face image and a difference between the second reconstructed face image and the second face image are both below a threshold;

obtaining a face-swapped image by extracting a feature from a face image in the video using the trained encoding network; and obtaining a reconstructed face image according to the feature, using the trained second decoding network, and replacing the face image with the reconstructed face image.

2. The method of claim 1, wherein, when the face image in is a side face image, the step of obtaining feature data comprises: convert the side face image into a frontal face image; and obtaining the feature data by extracting the feature from the said frontal face image using an encoding network; and the step of replacing the face image with the reconstructed face image comprises:

converting the reconstructed frontal face image to a reconstructed side face image; and replacing the side face image with the reconstructed side face image.

3. The method of claim 1, wherein, prior to replacing the face image in the video with the reconstructed face image, the method further comprises:

adjusting pixel values of the reconstructed face image according to the pixel values of the face image in the video so that a color histogram of the reconstructed face image matches that of the face image in the video.

4. The method of claim 1, wherein the step of face swap comprises: performing face detection in the video; removing erroneous recognition information; averaging face detection positions over a time period to stabilize the face detection position.

5. The method of claim 4, wherein the step of removing erroneous recognition information comprises: deleting a face detection information during a time period in which the face is not detected; and/or interpolating a missing face detection information using face detection information before and after the time period in which the face is not detected.

6. The method of claim 1, wherein the key points include facial key points, and the step of determining movement feature further comprises:

determining a facial area corresponding to the facial key points; and determining a facial expression used in diagnosing the disease according to the changes of the facial area over time.

7. The method of claim 6, wherein the facial key points comprises a plurality of key points around an eye, and the step of determining movement feature further comprises:

determining an eye area corresponding to the plurality of key points around the eye;

determining the change in an area of the opened eye over time;

determining a blinking frequency according to the change in the area of the open eye over time.

8. The method of claim 6, wherein the facial key points comprise a plurality of key points around a mouth; and the step of determining movement feature further comprises:

determining a mouth area according to multiple key points around the mouth; and determining the change in an area of the opened mouth over time.

9. The method of claim 1, wherein the key points include ankle key points, and the step of determining movement feature further comprises:

determining a stepping action according to change in positions of the ankle key points over time; and determining a stepping frequency according to the stepping action.

10. The method of claim 1, wherein the key points include a plurality of finger joints, and the step of determining movement feature further comprises:

determining a tapping action of an index finger and a thumb according to changes in positions of finger joints over time; and determining a frequency, an amplitude, and a trend in the changes of the tapping of the index finger and the thumb.

11. The method of claim 1, wherein the key points include a plurality of finger joints, and the step of determining movement feature further comprises:

determining a fisting action according to positions of the plurality of finger joints over time; and determining a fisting frequency according to the fisting action.

12. The method of claim 1, wherein the key points include a wrist and an elbow, and the step of determining movement feature further comprises:

determining a rotation according to positions of the wrist and the elbow over time; and determining a speed of the rotating arm according to the rotation action.

13. The method of claim 1, wherein the key points include hip joints, shoulder joints, knees, ankles, and the step of determining movement feature further comprises:

determining a gait according to changes in positions of hip joints, shoulder joints, the key points, and ankles over time; and determining shifts in a center of gravity and a degree of swaying in the center of gravity according to the gait.

14. The method of claim 1, wherein identifying of key points in the video comprises:

obtaining a key point distribution probability by recognizing each image frame in the video using a neural network; and determining a location of the key point according to the key point distribution probability.

15. An apparatus for analyzing a video of a movement with privacy protection function, comprising: at least one processor; a memory communicatively connected to at least one said processor, wherein the memory stores a command to be executed by the at least one processor, and the command is executed by the at least one processor so that the at least one processor executes method of analysis of claim 1.

* * * * *